No. 877,061. PATENTED JAN. 21, 1908.
J. D. EARNEST.
BOLT.
APPLICATION FILED JULY 6, 1907.
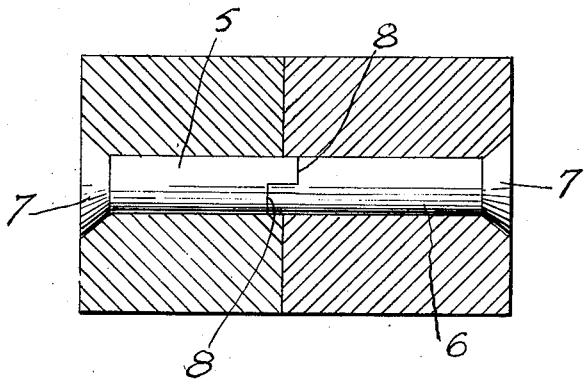
Fig. 1.
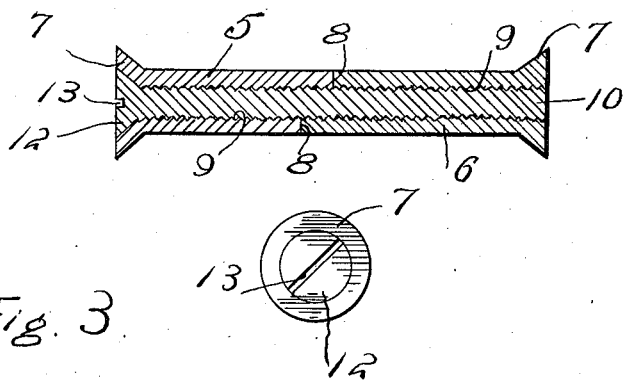
Fig. 2.
Fig. 3.
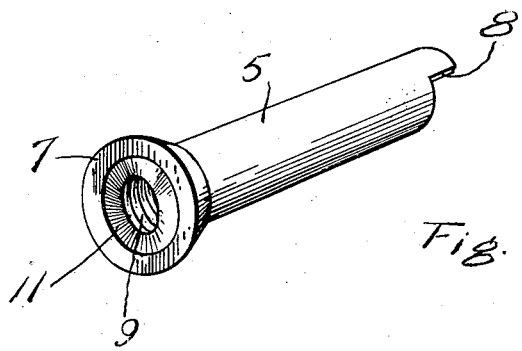
Fig. 4.
Inventor
Jefferson D. Earnest.
Witnesses
By
Attorneys

UNITED STATES PATENT OFFICE.

JEFFERSON D. EARNEST, OF RUTLEDGE, GEORGIA.

BOLT.

No. 877,061.

Specification of Letters Patent.

Patented Jan. 21, 1908.

Application filed July 6, 1907. Serial No. 382,497.

*To all whom it may concern:*

Be it known that I, JEFFERSON D. EARNEST, a citizen of the United States, residing at Rutledge, in the county of Morgan, State of Georgia, have invented certain new and useful Improvements in Bolts; and I do hereby declare the following to be a full, clear, and exact description of the invention, such as will enable others skilled in the art to which it appertains to make and use the same.

This invention relates to bolts and has for its object to provide a bolt of such construction that in addition to producing a more secure fastening the bolt heads will be concealed or rather lie flush with the face of the elements which they secure. These two features of the invention adapt the bolt to many different uses. The bolt, by reason of the fact that no nuts are employed, is well adapted for use in connection with rail joints and other heavy work, there being no way in which the bolt can be jarred loose and no threads exposed to the action of the elements. On the other hand, the neat appearance of the bolt and the fact that its heads are concealed or lie flush with the surfaces of the elements which it bonds, renders it most desirable in cabinet and other fine work.

In the accompanying drawings, Figure 1 is a sectional view through two boards showing the manner of using the bolt, the bolt being shown in elevation, Fig. 2 is a longitudinal sectional view through the bolt showing its several parts connected, Fig. 3 is an end view of the bolt, and, Fig. 4 is a detail perspective view of one of the sleeve members of the bolt.

As shown in the drawings the bolt comprises a pair of sleeve members one of which is indicated by the numeral 5 and the other by the numeral 6. Each of these sleeve members is provided at one of its ends with a conical or tapered head 7 and the other ends of the members are shouldered as at 8 in such a manner that when the shouldered ends of the two sleeve members are placed together a continuous unbroken shank will be formed. As here shown, the shoulders are of bayonet formation but it is to be understood that I am not to be limited to the use of shoulders of this shape as any other form of shoulder may be equally well employed the only stipulation being that an unbroken shank will be formed when the sleeve members are placed end to end.

Each of the sleeve sections 5 and 6 is interiorly screw threaded as at 9 for the threaded reception of a screw 10, a countersink 11 being provided in the head 7 of the sleeve section 5 to receive the conical head 12 of the screw 10, this head 12 being provided with the usual slot 13 in which a screw driver may be engaged to screw the bolt through the sleeve sections. The bolt is of such length that when screwed to the fullest extent into the sleeve sections it will have its end opposite its headed end flush with the flat face of the head 7 of the sleeve section 6, the corresponding face of the head 12 being flush with the flat face of the head 7 of the sleeve section 5. The wood or other elements to be secured together by the bolt are provided with countersinks in which the heads 7 of the sleeve sections are received and as a consequence, no part whatsoever of the bolt is exposed beyond the elements which it secures. Furthermore by reason of the fact that the bolt is shouldered, there can be no relative turning movement of the sleeve sections and consequently the bolt is absolutely secure until such time as the screw 10 shall have been removed.

What is claimed, is—

A flush bolt comprising a pair of sleeve sections placed end to end and having their meeting ends shouldered to engage each other and form an unbroken shank, heads formed at the opposite ends of the sleeve sections, and a screw threaded through the sleeve sections.

In testimony whereof, I affix my signature, in presence of two witnesses.

JEFFERSON D. EARNEST.

Witnesses:
H. R. WILSON,
C. F. RIDEN.